Jan. 19, 1943.    C. DORNIER    2,308,796
FIGHTING AIRPLANE
Filed Sept. 7, 1939
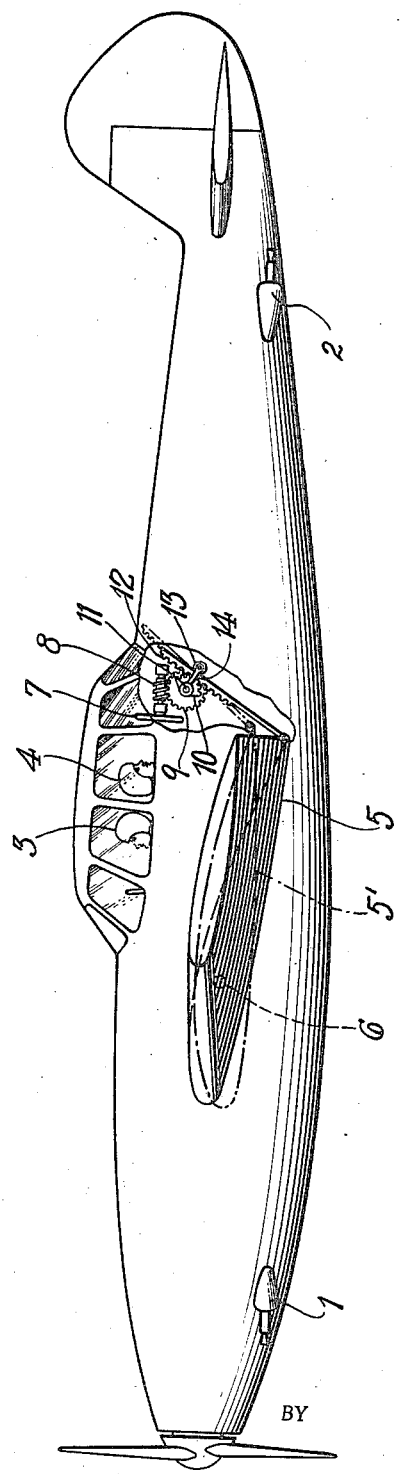
INVENTOR.
CLAUDE DORNIER
Karl A. Mayr
BY
ATTORNEY.

Patented Jan. 19, 1943

2,308,796

UNITED STATES PATENT OFFICE 2,308,796

FIGHTING AIRPLANE

Claude Dornier, Friedrichshafen-on-the-Bodensee, Germany; vested in the Alien Property Custodian Application September 7, 1939, Serial No. 293,689
In Germany September 9, 1938

4 Claims. (Cl. 244—48)

The present invention relates to airplanes for fighting purposes, more particularly to fighting airplanes having guns constructed into the rear part of the fuselage and being adapted to fire rearwards.

It is an object of the present invention to provide an airplane of the type set forth in which operation of the rearward pointing gun or guns which is or are rigidly connected with the rear part of the fuselage is considerably facilitated and does not interfere or block the operations of the forward pilot or gun operator. According to the present invention, the wing of the airplane is swingable about an axis which is transverse to the direction of flight. The rear gun operator is in a position to change the angle of incidence of the swingable wing by manipulating a control wheel, stick or other suitable device. He may increase the velocity of the airplane by independently reducing the angle of incidence without interfering with any of the control operations of or mechanisms manipulated by the forward pilot. In this manner the rearward gun operator may increase the distance from a pursuit plane without losing sight of said plane. The change of the angle of incidence of the main wings cannot be noticed by the operator of the pursuit plane and he therefore remains in the dark as to the intentions of the other airplane; this is not possible with conventional rudder and/or elevator operations which can be observed from a great distance. Increase of the angle of incidence can also be unnoticeably produced by the rear gun operator with a plane according to the present invention and the speed of the airplane can thus also be reduced by the rear gun operator.

Further and other objects and advantages of the present invention will be apparent from the accompanying specification and claims and shown in the drawing which, by way of illustration, shows what I now consider to be a preferred embodiment of my invention.

The one figure of the drawing annexed to the present application shows the fighting airplane according to the present invention in flight. Guns 1 and 2 are rigidly connected with the fuselage of the airplane, one gun pointing forward and one to the rear. In normal flying condition the airplane is controlled by the forward pilot 3 by means of the aileron and the elevator and rudder unit. As soon as the enemy machine is in the rear of the airplane the rearward pilot 4 controls the airplane by changing the position of the main wing 5, for example, by swinging said wing into the position 5' shown in dash and dotted lines where the wing is swung about an axis 6 which is disposed transversely to the direction of flight.

The mechanism shown by way of example for carrying out the present invention comprises a handwheel 7 which is in convenient reach of operator 4 and which directly drives the self-locking worm gear system 8, 9. Preferably two gear wheel segments 10, one on each side of the fuselage, are rigidly connected with the shaft 11 of wheel 9. Swingably connected with the wings 5 are racks 12 which individually engage the wheel segments 10. Engagement of racks 12 and wheel segments 10 is assured by rollers 13 which are swingably connected with shaft 11 by means of brackets 14.

While I believe the above described embodiment of my invention to be a preferred embodiment, I wish it to be understood that I do not desire to be limited to the exact details of design and construction shown and described, for obvious modifications will occur to a person skilled in the art.

I claim:

1. A fighting monoplane having, in combination, a fuselage, a wing, a pilot's seat facing forward, a rear gunner's seat disposed adjacent to and behind said pilot's seat and facing rearward, a rear gun immovably mounted on the rear part of said fuselage and adapted to be operated from said rear gunner's seat to fire rearwardly, means pivotally and directly mounting the wing on said fuselage for swinging the wing about an axis substantially transverse to the direction of flight, and a wing position changing mechanism connected with said wing and comprising an operating member disposed adjacent to said rear gunner's seat for operation by said rear gunner.

2. A fighting monoplane having, in combination, a fuselage, a wing, a pilot's seat facing forward, a rear gunner's seat disposed behind said pilot's seat and facing rearward, a rear gun immovably mounted on the rear part of said fuselage and adapted to be operated from said rear gunner's seat to fire rearwardly, means pivotally and directly mounting the wing on said fuselage for swinging the wing about an axis substantially transverse to the direction of flight, and a wing position changing mechanism connected with said wing and comprising an operating member disposed adjacent to said rear gunner's seat for operation by said rear gunner.

3. A fighting monoplane having, in combination, a fuselage, a wing, a pilot's seat facing forward, a rear gunner's seat disposed behind said pilot's seat and facing rearward, a rear gun immovably mounted on the rear part of said fuselage and adapted to be operated from said rear gunner's seat to fire rearwardly, means pivotally and directly mounting the wing on said fuselage for swinging the wing about an axis substantially transverse to the direction of flight, and a wing position changing mechanism connected with said wing and comprising an operating member disposed adjacent to said rear gunner's seat for operation by said rear gunner, said wing position changing mechanism comprising self-locking means for preventing unintended change of position of said wing.

4. In a fighting monoplane, a fuselage having a rear portion, means directly and pivotally mounting the wing on said fuselage for swinging the wing about an axis substantially transverse to the direction of flight, monoplane operating control means, a forwardly facing pilot's seat adjacent said control means, a rearwardly facing gunner's seat behind the pilot's seat, a gun rigidly mounted on the rear portion of said fuselage and adapted to be operated from said gunner's seat, and a mechanism connected with said wing for changing the angle of incidence thereof, said mechanism being independent from said control means and adapted to be operated from said gunner's seat.

CLAUDE DORNIER.